Nov. 9, 1965    J. J. CHISHOLM    3,216,313
MONOCHROMATOR OF THE TYPE HAVING A PLANE GRATING THEREIN
Filed June 23, 1961

*INVENTOR.*
JAMES J. CHISHOLM
BY Frank C. Parker
David E. Dougherty
*ATTORNEYS*

3,216,313
MONOCHROMATOR OF THE TYPE HAVING A
PLANE GRATING THEREIN
James J. Chisholm, Rochester, N.Y., assignor to Bausch
& Lomb Incorporated, Rochester, N.Y., a corporation
of New York
Filed June 23, 1961, Ser. No. 119,205
7 Claims. (Cl. 88—14)

This invention relates to a novel monochromator or the like, and more particularly, to a monochromator utilizing a plane grating and having a minimum number of reflecting surfaces.

In monochromators, particularly those operating in the ultraviolet region, it is highly desirable to have a compact optical system, and to minimize the number of reflecting surfaces. One reason for minimizing the number of reflecting surfaces is that light losses occur at each reflecting plane. Particularly in the ultraviolet region, it is difficult and expensive to produce efficient reflectors. Furthermore aluminum coating used in making such reflectors deteriorates with time and the coating cannot be cleaned mechanically. Reducing the number of reflections therefore, renders more tolerable the light losses caused by imperfections in mirrors, and gratings.

One way of reducing the number of reflections is to use a plane grating with divergent light incident upon the grating. This approach differs from a conventional approach which uses collimated light incident upon the gratings. The use of divergent light incident upon a plane grating, however, introduces undesirable aberrations. Such aberrations adversely affect the performance characteristics in a device of this type.

Advantageously, a device according to the present invention reduces the number of reflecting surfaces to thereby reduce the light losses within the instrument, and yet, maintain performance characteristics desirable in instruments of this type. Furthermore, the device incorporates a novel means for aberration correction, whereby a monochromator or the like may be produced, which is approximately one-third the size of prior monochromators of equal performance, is relatively inexpensive to manufacture, and is equal to or better in performance than conventional instruments of this type.

Accordingly it is possible to produce a novel monochromator having only two reflecting surfaces therein. While this normally introduces aberrations which adversely effect the performance characteristics, it has been found that inserting a cylindrical lens in the ray path corrects for these aberrations.

Briefly, a monochromator, according to the present invention comprises an entrance slit adapted to receive light rays from a light source. Light rays diverge from the slit and are incident upon a plane grating. The illuminated slit may be considered as a light source. The light is diffracted by the plane grating and directed to an imaging element such as a concave mirror. Light having a particular wave length is centered on the concave mirror and reflected along the optic axis toward an exit slit. According to a preferred embodiment of the invention an image of the entrance slit having light of a particular wave length is formed at the exit slit. An aspheric lens preferably a cylindrical lens is placed in the ray path, preferably near the exit slit, to correct for undesirable aberrations.

The invention will now be described in more detail in connection with the accompanying drawing, in which.

Figure 1:
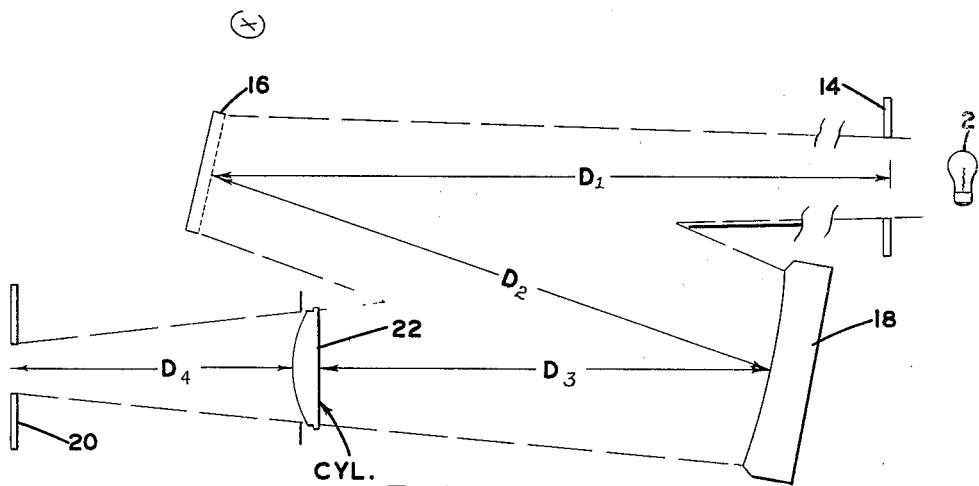
FIG. 1 is a schematic diagram illustrating an optical system according to the present invention.

Referring now, more particularly, to the drawings, light from any suitable light source 2 is directed into the instrument through an entrance slit 14. The light source 2 and slit 14 are arranged so that light rays entering the apparatus diverge toward and are incident upon a plane diffraction grating 16. The light rays striking the diffraction grating, are diffracted thereby and reflected to a concave mirror 18. The diffraction grating is rotatably mounted in the instrument, in order to scan the spectrum.

The diffracted light is directed to a concave mirror 18. Light having a particular wave length is centered on the concave mirror 18 and reflected along the optic axis toward an exit slit 20. An image of the entrance slit having light of a particular wave length is formed at the exit slit 20. A cylindrical lens 22 is placed on the optic axis of the monochromator near the exit slit 20 and between the concave mirror 18 and the exit slit 20. The cylindrical lens 22 corrects for the aberrations to thereby provide a relatively undistorted image of the entrance slit. The cylindrical lens 22 overcomes to a high degree the astigmatism which is present when the cylindrical lens is absent.

Figure 2:
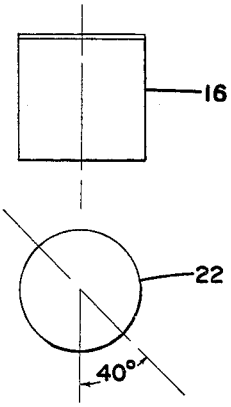
FIG. 2 is a schematic diagram illustrating the axial alignment of a cylindrical lens, and a diffraction grating according to a preferred embodiment of the invention.

In the preferred embodiment of the invention illustrated in FIG. 2, the axis of the cylindrical lens 22 is offset by approximately 40°, to the axis of the grating 16. The grating 16 is provided with means so that it may be rotated about its axis to provide monochromatic light of different wave lengths at the exit slit.

The following lists of conjugates show the details of the preferred embodiment. These details are shown as examples and are not to be construed as a limitation on the invention.

$D_1$ equals 200 mm.; and $D_2$ equals 152.4 mm. $D_3$ equals 121 mm.; and $D_4$ equals 70 mm. $D_1$ is the distance from the entrance slit to the grating; and $D_2$ is the distance from the grating to the mirror. $D_3$ is the distance from the mirror to the cylinder lens; and $D_4$ is the distance from the cylinder lens to the exit slit.

The preferred embodiment of the invention incorporates a quartz cylindrical lens with a 1.631 mm. cylindrical radius, a plano radius of infinity, a thickness of 3 mm., a diameter of 33 mm., and a free aperture of 30 mm. The concave mirror has a radius of 255.86 mm., a 59 mm. diameter, and a 56.0 mm. free aperture.

Four gratings have been individually incorporated in the preferred embodiment in order to obtain optimum results over various ranges of the spectrum. Details of the gratings are shown in the table below:

| Grating | I | II | III | IV |
|---|---|---|---|---|
| Size, mm. sq | 33 x 33 | 33 x 33 | 33 x 33 | 33 x 33 |
| Free aperture, mm. dia | 31 | 31 | 31 | 31 |
| No. grooves/mm | 2,700 | 1,350 | 675 | 337.5 |
| For | UV | Visual | Near I.R. | Far I.R. |
| Range in microns | .18 to .4 | .35 to .8 | .7 to 1.6 | 1.4 to 3.2 |
| Blaze angle, deg | 20 | 20 | 20 | 20 |

Figure 3:
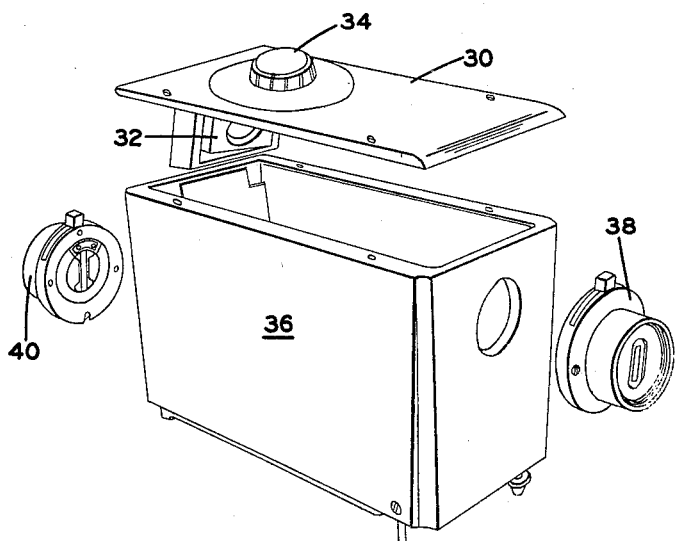
FIG. 3 is an exploded perspective view of a monochromator according to the present invention.

The exploded perspective view shown in FIG. 3 illustrates a monochromator having an optical system according to one embodiment of the invention; that is, the optical system shown in FIGS. 1 and 2. A top 30 of the monochromator carries the diffraction grating 16 mounted on the lower side thereof. The grating 16 is rotatably mounted and may be rotated about its axis by a knob 34. A hollow housing 36 has the concave mirror 18 and the cylindrical lens 22, not shown in FIG. 3, mounted in the lower portion thereof. The mirror 18 and lens 22 are arranged as shown in the diagrams in FIGS. 1 and 2. Also illustrated in FIG. 3 are an adjustable entrance slit 38 and an adjustable exit slit 40, of conventional type.

Figure 4:
FIG. 4 is a schematic diagram illustrating a second embodiment of the invention.

FIG. 4 illustrates a second embodiment of the invention wherein a pair of cylindrical lenses 23 are used in place of the single lens 22. The pair of lenses 23 introduces an additional variable for aberration correction.

What is claimed is:

1. A monochromator or the like comprising an entrance slit adapted to receive light rays from a light source, a plane grating optically aligned with said entrance slit for receiving non-collimated light rays which pass through said entrance slit from the light source for diffracting the light rays incident thereupon, a concave mirror and an exit slit, said mirror disposed in optical alignment with said grating and confronting said grating for directing the diffracted light toward said exit slit, and an aspheric lens disposed on the optical axis of the monochromator between said entrance slit and said exit slit to correct for aberrations.

2. A monochromator or the like comprising an entrance slit adapted to receive light rays from a light source, a plane reflective grating optically aligned with said entrance slit receiving non-collimated light rays which pass through said entrance slit from the light source for diffracting the light rays incident thereupon, a concave mirror and an exit slit, said mirror disposed in optical alignment with said grating and confronting said grating for directing the diffracted light toward said exit slit, and a cylindrical lens disposed on the optical axis of the monochromator between said mirror and said exit slit relatively close to said exit slit with respect to its distance from said entrance slit and with an axis of said cylindrical lens rotated with respect to the line structure of the grating.

3. A monochromaor or the like comprising an entrance slit adapted to receive light rays from a light source, a plane reflective grating optically aligned with said entrance slit for receiving non-collimated light rays which pass through said entrance slit from the light source and rotatably mounted in the monchromator for diffracting the light rays incident upon said grating, a concave mirror and an exit slit, said mirror disposed in optical alignment with said grating and confronting said grating for directing the diffracted light toward said exit slit, and a cylindrical lens disposed between said mirror and said exit slit relatively close to said exit slit with respect to its distance from said entrance slit and with an axis of said cylindrical lens rotated with respect to the line structure of the grating.

4. A monochromator or the like comprising an entrance slit adapted to receive light rays from a light source, a plane reflective grating optically aligned with said entrance slit for receiving non-collimated light rays which pass through said entrance slit from the light source for diffracting the light rays incident thereupon, a concave mirror and an exit slit, said mirror disposed in optical alignment with said grating and confronting said grating for forming an image of said entrance slit having light of a particular wave length at said exit slit, and a cylindrical lens disposed on the optical axis of the monochromator between said mirror and said exit slit relatively close to said exit slit with respect to its distance from said entrance slit and with an axis of said cylindrical lens rotated approximately 40° with respect to the line structure of said grating.

5. A monochromator or the like comprising an entrance slit adapted to receive light rays from a light source, a plane reflective grating optically aligned with said entrance slit for receiving non-collimated light rays which pass through said entrance slit rotatably mounted in the monochromator for diffracting light rays incident thereupon, said grating having a blaze angle of approximately 20° and between 337.5 and 2700 grooves per mm., a concave mirror and an exit slit, said mirror disposed in optical alignment with said grating collecting the diffracted light and forming an image of said entrance slit having light of a particular wave length at said exit slit, and a cylindrical lens disposed on the optical axis of the monochromator between said mirror and said exit slit relatively close to the exit slit with respect to its distance from said entrance slit and wtih the axis of said cylindrical lens rotated approximately 40° with respect to the line structure of the grating.

6. A monochromator or the like comprising an entrance slit adapted to receive light rays from a light source, a plane reflective grating optically aligned with said entrance slit for receiving non-collimated light rays which pass through said entraance slit rotatably mounted in the monochromator for diffracting light rays incident thereupon, said grating having a blaze angle of approximately 20° and N times 337.5 grooves per mm. wherein N is an integer between 1 and 4 inclusive, a concave mirror and an exit slit, said mirror having a radius of approximately 255 mm. and located approximately 152.4 mm. from said grating in optical alignment with said grating, said mirror collecting diffracted light and forming an image of said entrance slit having light of a particular wave length at said exit slit, and a cylindrical lens located on the optical axis of the monochromator between said mirror and said exit slit approximately 121 mm. from said concave mirror and approximately 70 mm. from said exit slit wtih an optical axis of said cylindrical lens rotated approximately 40° with respect to the line structure of said grating.

7. A monochromator or the like comprising an entrance slit adapted to receive light rays from a light source, a plane reflective grating optically aligned with said entrance slit for receiving non-collimated light rays which pass through said entrance slit from the light source for diffracting light rays incident thereupon, a concave mirror and an exit slit, said mirror disposed in optical alignment with said grating and confronting said grating for directing the diffracted light toward said exit slit, and a plurality of cylindrical lenses disposed on the optical axis of the monochromator between said mirror and said exit slit relatively close to said exit slit with respect to its distance from said entrance slit.

References Cited by the Examiner

UNITED STATES PATENTS 2,671,376   3/54   Merton _____ 88—14
2,797,609   7/57   White _____ 88—14

OTHER REFERENCES

Green et al.: "An Auxiliary Lens for Use With the Concave Grating," Journal of the Optical Society of America, vol. 24, No. 12, December 1934, pages 348–350.

Oldenberg: "On the Intensity of Illumination in Spectrographs," Journal of the Optical Society of America, vol. 22, No. 8, August 1932, pages 441–455.

JEWELL H. PEDERSEN, *Primary Examiner.*

EMIL G. ANDERSON, *Examiner.*